United States Patent
Armellin (10) Patent No.: US 7,275,576 B2
(45) Date of Patent: Oct. 2, 2007

(54) METHOD OF MAKING REINFORCEMENT ELEMENTS FOR A VEHICLE TYRE, AND A TYRE FOR A VEHICLE WHEEL

(75) Inventor: Giancarlo Armellin, Nova Milanese (IT)

(73) Assignee: Pirelli Pneumatici S.p.A., Milan (IT)

(*) Notice: Subject to any disclaimer, the term of this patent is extended or adjusted under 35 U.S.C. 154(b) by 135 days.

(21) Appl. No.: 10/493,384

(22) PCT Filed: Oct. 25, 2001

(86) PCT No.: PCT/IT01/00544

§ 371 (c)(1),
(2), (4) Date: Nov. 12, 2004

(87) PCT Pub. No.: WO03/035378

PCT Pub. Date: May 1, 2003

(65) Prior Publication Data

US 2005/0061417 A1    Mar. 24, 2005

(51) Int. Cl.
*B60C 9/00* (2006.01)
*B29D 30/16* (2006.01)

(52) U.S. Cl. ............ 152/555; 152/563; 156/117; 156/133

(58) Field of Classification Search ........ 156/117, 156/397, 133, 123, 130.7; 152/555, 563, 152/533, 543, 559, 562
See application file for complete search history.

(56) References Cited

U.S. PATENT DOCUMENTS

| | | | | |
|---|---|---|---|---|
| 2,352,055 A | * | 6/1944 | Witt | 156/397 |
| 2,906,314 A | * | 9/1959 | Trevaskis | 152/562 |
| 2,997,091 A | * | 8/1961 | Debesson | 152/542 |
| 3,002,874 A | * | 10/1961 | Lowe | 156/397 |
| 3,024,828 A | * | 3/1962 | Smith et al. | 152/533 |
| 3,113,738 A | * | 12/1963 | Vanzo | 242/477 |
| 3,789,899 A | | 2/1974 | Kobayashi | |
| 3,904,463 A | | 9/1975 | Boileau | |
| 4,259,129 A | | 3/1981 | Schmidt | |
| 4,413,663 A | | 11/1983 | Sullenger | |

(Continued)

FOREIGN PATENT DOCUMENTS

CA    2340571 A1  *  9/2002

(Continued)

OTHER PUBLICATIONS

"Academic Press Dictionary of Science and Technology" (1992), 7 sheets, http://apcatalog.com/cgi-bin/AP?ISBN=0122001000&LOCATION=US&FORM=1, http://www.harcourt.com/dictionary/def/3/5/9/2/3592900.html.

*Primary Examiner*—Geoffrey L. Knable
(74) *Attorney, Agent, or Firm*—Finnegan, Henderson, Farabow, Garrett & Dunner, L.L.P.

(57) ABSTRACT

A method of making reinforcing elements for a vehicle tire includes laying down at least one continuous thread element on a support element of the tire according to a deposition path substantially concentric with a rotation axis of the tire. A tire for a vehicle wheel includes a carcass structure, a belt structure, a pair of sidewalls, a tread band, and reinforcing elements. The reinforcing elements include at least one continuous thread element formed into coils around a rotation axis of the tire. For the method and in the tire, the at least one continuous thread element is superposed on itself at a plurality of crossing points.

13 Claims, 5 Drawing Sheets

U.S. PATENT DOCUMENTS

| | | |
|---|---|---|
| 5,007,974 A | 4/1991 | Maathuis et al. |
| 5,395,475 A | 3/1995 | Ozawa et al. |
| 5,975,175 A | 11/1999 | Armellin |
| 6,260,598 B1 * | 7/2001 | Tanaka ........................ 152/555 |

FOREIGN PATENT DOCUMENTS

| | | |
|---|---|---|
| EP | 0 976 536 A2 | 2/2000 |
| GB | 813376 | 5/1959 |
| JP | 2000-198329 | 7/2000 |
| JP | 2001-260250 | 9/2001 |
| WO | WO 00/35666 | 6/2000 |
| WO | WO 02/096631 A1 | 12/2002 |

* cited by examiner

METHOD OF MAKING REINFORCEMENT ELEMENTS FOR A VEHICLE TYRE, AND A TYRE FOR A VEHICLE WHEEL

CROSS-REFERENCE TO RELATED APPLICATIONS

This application is a national-phase entry under 35 U.S.C. § 371 from International Application No. PCT/IT01/00544, filed Oct. 25, 2001, in the Italian Patent Office, the content of which is relied upon and incorporated herein by reference.

BACKGROUND OF THE INVENTION

1. Field of the Invention

The present invention relates to a method of making reinforcing elements for vehicle tyres, comprising the step of laying down at least one continuous thread-like element onto a support element, according to a deposition path substantially concentric with the rotation axis of the tyre.

The invention also relates to a tyre integrating reinforcing elements made in accordance with said method, said tyre being of the type comprising a carcass structure including at least one carcass ply having its ends in engagement with respective circumferentially inextensible annular anchoring structures; said carcass ply having two axially-opposite side portions separated from each other by a crown portion and each extending radially away from one of the annular anchoring structures until said crown portion; a belt structure applied to said crown portion at a radially external position relative to the carcass ply; a pair of sidewalls applied to said side portions at an axially external position relative to the surfaces of the carcass ply; a tread band applied to the belt structure at a radially external position thereof; reinforcing elements, each comprising at least one continuous thread-like element formed into coils substantially concentric with the rotation axis of the tyre.

2. Description of the Related Art

Manufacture of tyres for vehicle wheels involves formation of a carcass structure essentially made up of one or more carcass plies shaped in a substantially toroidal configuration and having their axially-opposite side edges in engagement with respective annular anchoring structures integrating circumferentially inextensible annular inserts usually referred as "bead rings" placed at the tyre regions usually identified as "beads".

Applied to the carcass structure, at a radially external position, is a belt structure comprising one or more belt plies in the form of a closed loop, essentially made up of textile or metallic cords suitably oriented with respect to each other and to the cords belonging to the adjacent carcass plies.

At a radially external position to the belt structure a tread band is applied which is usually comprised of a strip of elastomer material of appropriate thickness.

It should be pointed out that, to the aims of the present description, by the term "elastomer material" it is intended blends of rubber in there entirety, i.e. assemblies formed of at least one base polymer suitably amalgamated with reinforcing fillers and process additives of various types.

Finally, to the opposite sides of the tyre being processes, a pair of sidewalls is applied each of which covers a side portion of the tyre included between a so-called shoulder region, located close to the respective side edge of the tread band, and a so-called bead located at the corresponding bead core.

Tyres are generally classified into at least two categories, differentiated from each other according to the orientation exhibited by the cords being part of the carcass plies. In particular, there are the so-called "radial tyres" in which each of the cords arranged in the carcass ply or plies lies in a plane substantially radial to the rotation axis of the tyre, i.e. has an orientation substantially orthogonal to the circumferential extension direction hen there are the so-called tyres "of the conventional type" or "cross-ply tyres", the carcass structure of which generally comprises at least one carcass ply having cords oriented obliquely to the circumferential extension direction of the tyre, and a second carcass ply the cords of which exhibit a symmetrically-crossed oblique orientation with respect to them cords of the first ply.

Tyres of the radial type, as compared with those of the conventional type, offer advantages in terms of lightness, ride comfort, resistance to wear and structural strength to high speeds. Conversely, they have a sidewall of weaker structure than tyres of the conventional type, so that a possible failure at the sidewall usually involves the tyre being out of use.

The above features have caused the tyres of the conventional type to be practically fallen into disuse in those Countries in which a modern road network (minimising the risk of accidental failures to the sidewall) is present, in favour of tyres of the radial type.

Development in time of these tyres has led to a progressive reduction in their section height also for the purpose of obviating the feeling of ride unsteadiness generated by the sidewalls that are radially very extended.

In particular cases and/or for specific uses requiring for the tyre sidewalls a higher strength than that offered by the carcass ply, also in combination with a reduced section height, the sidewalls of a tyre must be strengthened by means of additional reinforcing elements.

The traditional production methods essentially involve that the above listed tyre components should be first made separately from each other, to be then assembled during a tyre-building step.

The Applicant's present trend however is of resorting to production methodologies enabling production and storage of semi-finished products to be minimised or, possibly, eliminated.

Practically, the research and development studies carried out by the Applicant are oriented to new process solutions enabling the individual components to be made by directly forming them on the tyre being built, preferably following a pre-established sequence.

This is made possible above all in the production of tyres of the radial type.

In this connection, production processes have been proposed which aim at obtaining given tyre components, such as tread band, sidewalls or others for example, by laying down onto a toroidal support carrying the tyre being worked, a continuous strip-like element of elastomer material having a reduced section as compared with that of the component to be obtained and disposed to form a plurality of coils around the rotation axis of the tyre, which coils are arranged consecutively in side by side relationship and/or superposed on each other so as to define the component itself in its final configuration.

In the European Patent Application No. 01830350.3 the Applicant has proposed adoption of annular stiffening inserts placed at the sidewalls of the radial tyres to increase stiffness of same, obtained by circumferentially winding at least one continuous thread-like element into several consecutive rings so as to form a series of coils disposed in radial side-by-side relationship and concentric with the geometric rotation axis of the tyre.

The Applicant has perceived that performance of tyres obtained by use of inserts formed of one or more thread-like elements spirally wound up can be further improved. For instance, increasing the sidewall stiffness in tyres intended for equipping two-wheeled vehicles is particularly advantageous because during the ride on a bend these tyres bank with respect to the vertical, according to camber angles of a very high value, thereby submitting the tyre sidewalls to important stresses.

These tyres have a marked transverse curvature at the crown which is normally defined by the particular value of the ratio between the distance of the tread centre from the line passing through the laterally opposite extremities of the tread itself, measured at the equatorial plane of the tyre, and the distance measured along the tyre chord between said extremities. In tyres for two-wheeled vehicles the value of the curvature ratio is generally at least about 0.15 and usually it is in the order of about 0.3 in the case of rear tyres and also higher, until about 0.45, in the case of front tyres, against a value usually in the order of about 0.05 in motor-vehicle tyres.

SUMMARY OF THE INVENTION

The Applicant has perceived that, in accordance with the present invention, it is possible to increase the sidewall stiffness in radial tyres while keeping the advantages typical of a tyre of a radial structure, in terms of lightness, ride comfort and structural strength.

Based on this perception, a new manufacturing method has been conceived in which a continuous thread-like element is laid down according to a deposition path substantially concentric with the rotation axis of the tyre, said thread-like element being passed across itself at several crossing points. In this way a sort of reinforcing network is created.

Therefore, it is an object of the present invention to provide a method of making reinforcing elements for vehicle tyres, comprising the step of laying down at least one continuous thread-like element onto a support element, according to a deposition path substantially concentric with the rotation axis of the tyre, characterised by superposing said at least-one thread-like element upon itself at a plurality of crossing points.

It is a further object of the invention to provide a tyre for vehicle wheels, characterised by reinforcing elements placed at the sidewalls of said tyre, each comprising at least one continuous thread-like element superposed upon itself at a plurality of crossing points.

The tyre of the present invention can be for either two-wheeled or four-wheeled vehicles, the latter being both cars and the so-called heavy-duty vehicles.

In the present specification and claims, the term "support element" means the tyre structure upon which the reinforcing element being the object of the present invention is laid down, as better clarified in the following.

BRIEF DESCRIPTION OF THE DRAWINGS

Further features and advantages will become more apparent from the detailed description of preferred but not exclusive embodiments of a method of making reinforcing elements for vehicle tyres, and of a tyre incorporating reinforcing elements made according to the present invention. This description will be set out hereinafter with reference to the accompanying drawings, given by way of non-limiting example, in which.

DETAILED DESCRIPTION OF THE EXEMPLARY EMBODIMENTS

With reference to the drawings, a tyre having a reinforcing element obtainable by the method according to the present invention has been generally identified by reference number 1.

Figure 2:
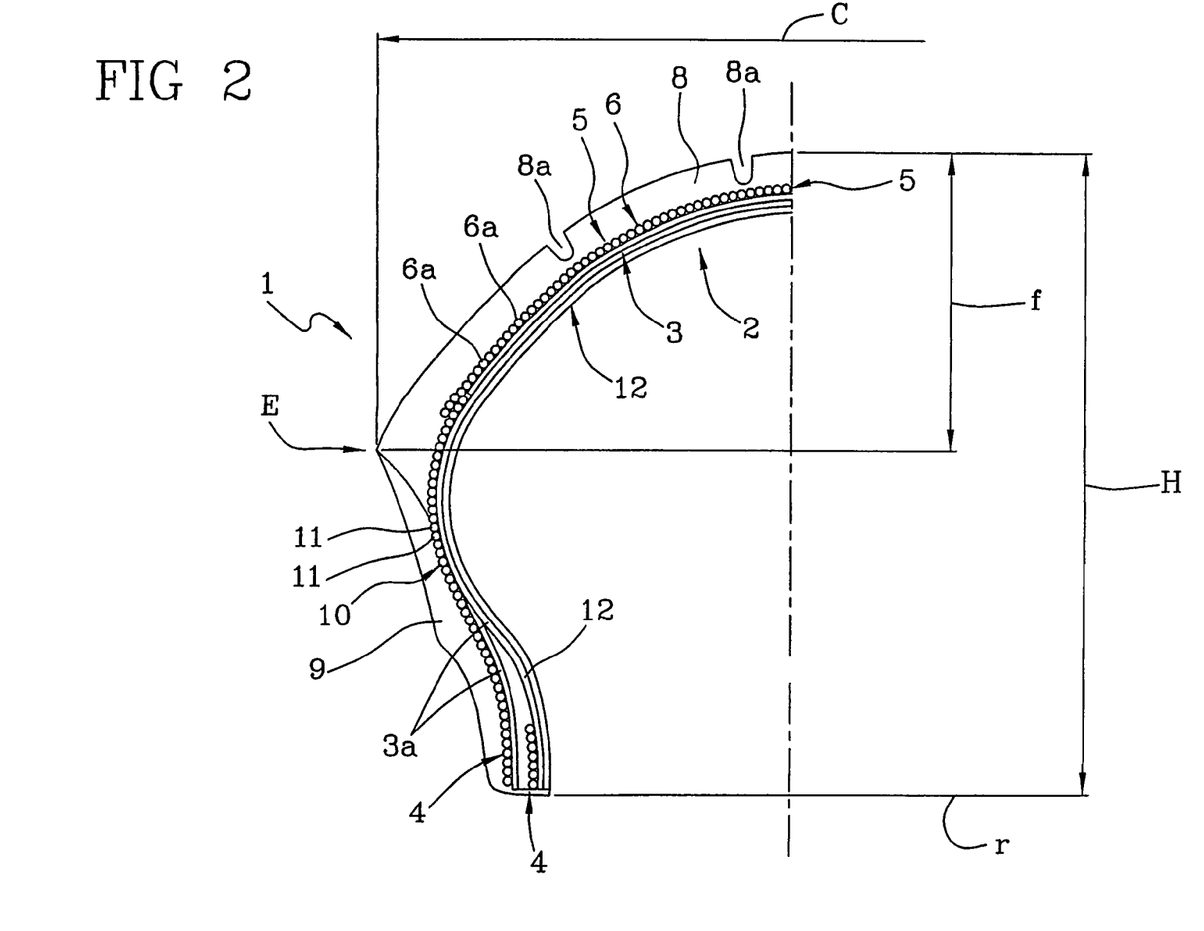
FIG. 2 is an interrupted section taken in a plane radial to the rotation axis of a tyre for two-wheeled vehicles, showing the cross-section outline of the tyre components.

In the embodiment shown in FIG. 2 concerning a tyre for motor-vehicles, tyre 1 has a right section marked by a high transverse curvature: in more detail, said tyre 1 has a section height H measured in the equatorial plane between the centre of the tread band and the fitting diameter identified by reference line r, passing through the tyre beads.

In addition, tyre 1 has a width C defined by the distance between the laterally opposite ends E of the tread itself, and a curvature defined by the particular value of the ratio between the distance f of the tread centre from the line passing through the extremities E of the tread itself, measured in the equatorial plane of the tyre.

The invention takes a particular importance when applied to tyres having a section ratio H/C higher than 0.70 and generally also marked by a curvature ratio f/C higher than 0.15, although its significance and advantages also apply to tyres of other types, those for four-wheeled-vehicles for example, whether they are cars or vehicles of the so-called heavy-duty type.

Figure 1:
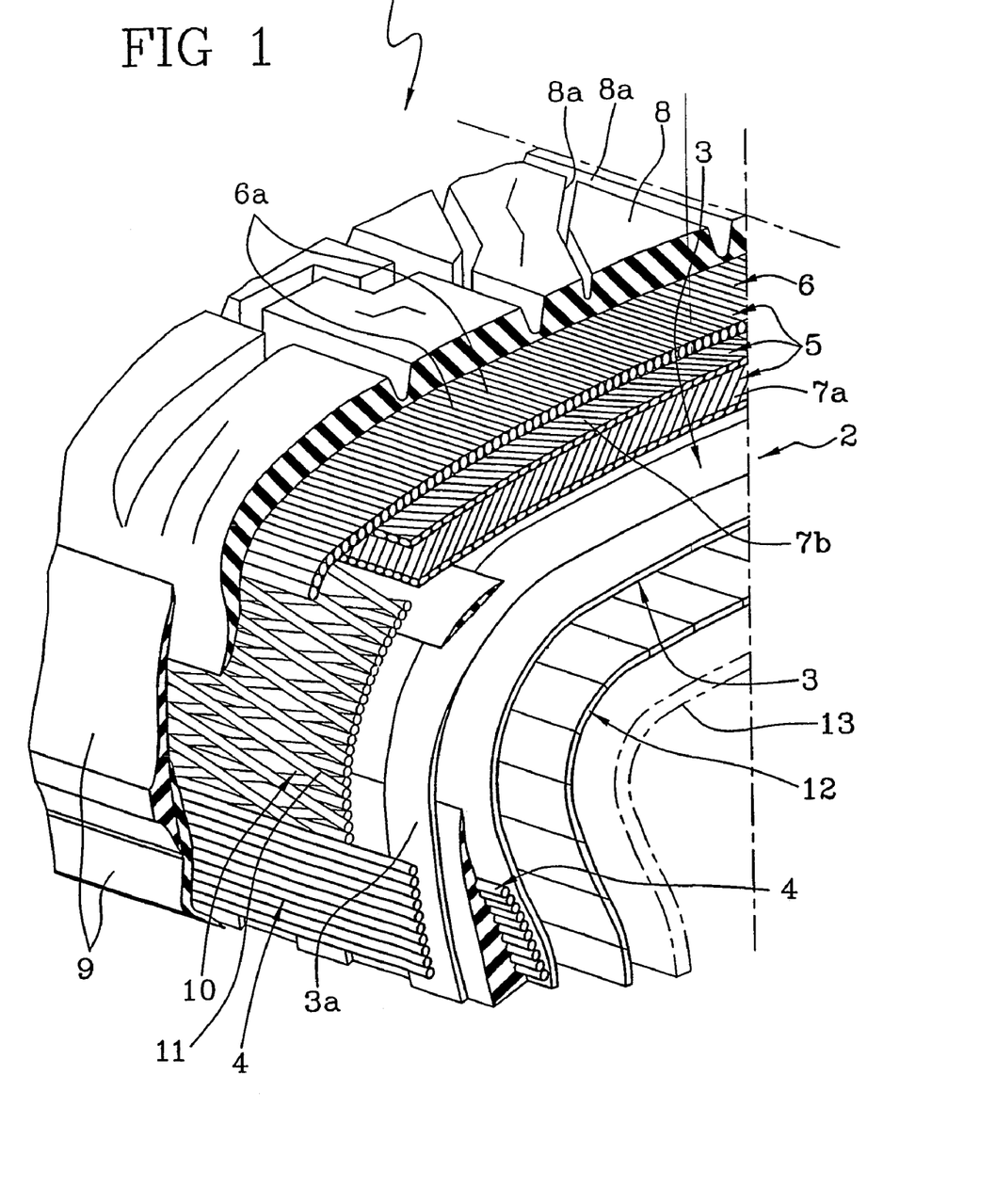
FIG. 1 is a fragmentary perspective and split view of a tyre for four-wheeled vehicles provided with a reinforcing element accomplished in accordance with the present invention.

With reference to FIGS. 1 and 2, tyre 1 comprises a carcass structure 2 having at least one carcass ply 3 of a substantially toroidal conformation and engaged, by its axially spaced apart circumferential edges, with a pair of annular anchoring structures 4 each of which, when tyre 1 is finished, is disposed in the region usually denoted as "bead".

The carcass ply 3 has two side portions 3a each extending radially away from one of the annular anchoring structures 4.

Applied to the carcass structure 2, at a circumferentially external position, is a belt structure 5 comprising at least one primary belt strip 6, including one or more continuous parallel cords or other appropriate thread-like elements, wound into coils 6a disposed in axial side by side relationship and having a constant or varying density (the last-mentioned case being not shown), as described in the U.S. Pat. No. 5,975,175 patent in the name of the same Applicant, and oriented at a substantially zero angle with respect to an equatorial plane of the tyre. Possible auxiliary belt strips 7a, 7b (diagrammatically shown in chain line in FIG. 1) can be placed at a radially internal position relative to the primary belt strip 6. Circumferentially superposed on the belt structure 5 is a tread band 8 on which, following a moulding operation carried out concurrently with vulcanisation of the tyre, longitudinal and/or transverse grooves 8a disposed to define a desired "tread pattern" can be formed.

Tyre 1 also comprises a pair of so-called "sidewalls" 9 laterally applied, on opposite sides, to reinforcing elements 10 as hereinafter defined, at an axially external position relative to the side portions 3a of the carcass ply 3.

Tyre 1 further comprises at least one pair of reinforcing elements 10. Each reinforcing element 10 comprises at least one continuous thread-like element 11 extending in the form of coils 11a wound around the rotation axis X of tyre 1, and it is axially interposed between a respective side portion 3a of the carcass ply 3 and one of the sidewalls 9. Preferably, each element 10 extends between one of the annular anchoring structures 4 and a corresponding side edge of the belt structure 5. In more detail, the side edge of the belt structure 5 is preferably overlapped, by a desired extent, to the radially external end edge of the reinforcing element 10, as exemplified in FIGS. 1 and 2.

The carcass structure 2 can be possibly coated, on its inner surface, with a so-called "liner" 12, essentially consisting of at least one air-tight layer of elastomer material adapted to ensure a hermetic seal of tyre 1 when inflated.

The present invention can be advantageously put into practice by a method according to which, except for that which is described in more detail in the following of the present specification, assembling of the above listed components, as well as production of one or more of same, is preferably achieved following the teachings proposed in document EP-A-0976536, in the name of the same Applicant, for example.

Within the manufacturing process of tyre 1, formation of the carcass ply 3 can be advantageously carried out by sequentially laying down previously cut strip-like elements, disposed consecutively in mutual circumferential side by side relationship on the outer surface of a toroidal support 13 on which liner 12 may have been previously formed.

Accomplishment of tyre 1 involves execution of further working steps, such as application of the belt structure 5 at a position radially external to the carcass structure 3, application of the tread band 8 at a position radially external to the belt structure 5 and application of sidewalls 9 on opposite sides of the carcass structure 3, not further described as not of importance to the aims of the invention.

The reinforcing elements 10 are laid down before application of the belt and sidewalls.

Figure 6:
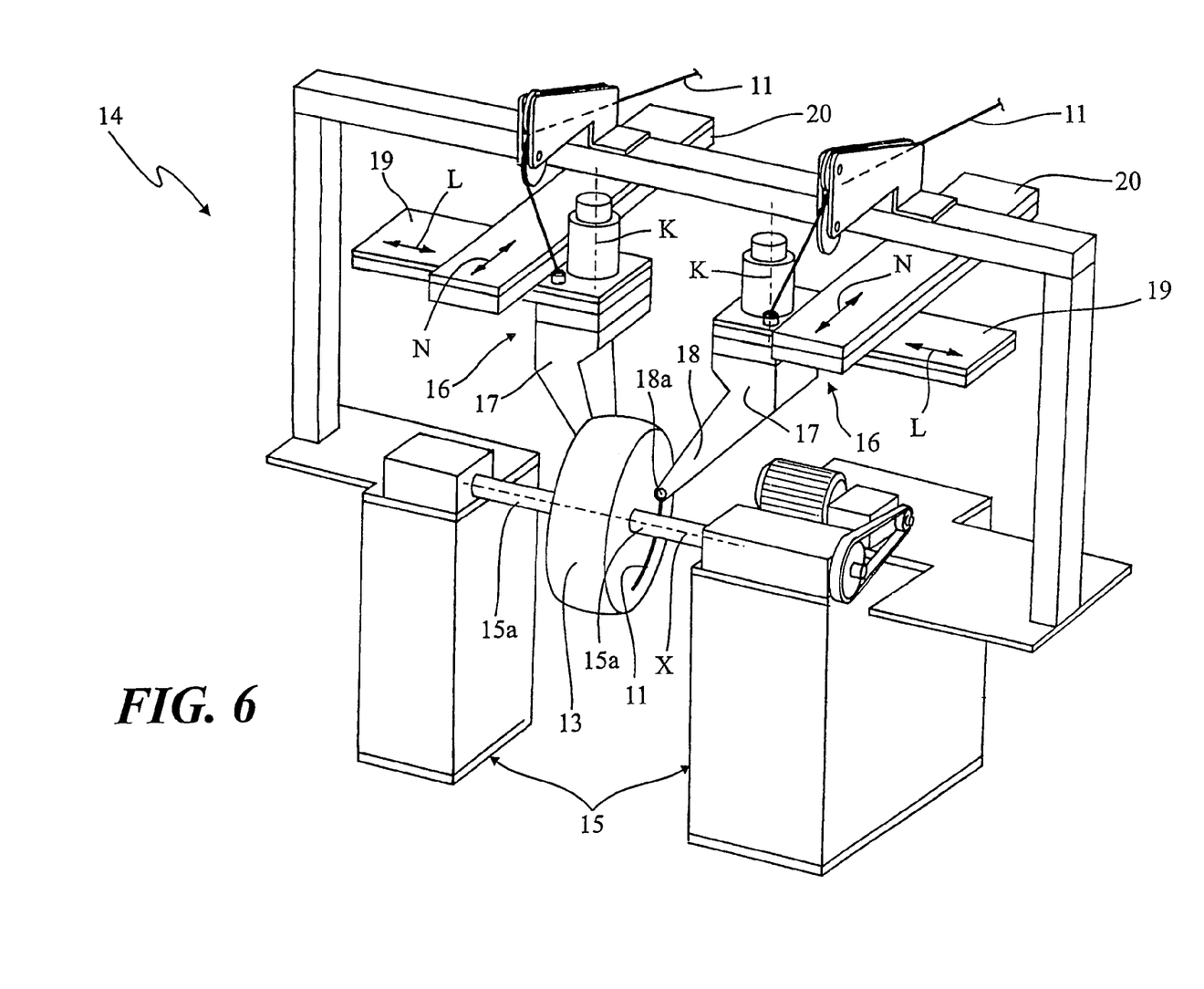
FIGS. 6 and 7 show two different apparatus adapted to make the reinforcing elements for vehicle wheels in accordance with the present invention.

Within this manufacturing process, an apparatus to be used for making the reinforcing elements 10 being part of tyre 1 has been designated by 14 in FIG. 6.

To this aim, apparatus 14 essentially comprises a support device 15 arranged to removably engage the toroidal support 13 at an attachment shank 15a coaxially jutting out on opposite sides with respect to said support 13. Associated with the support device 15 are appropriate devices to drive the toroidal support 13 in rotation around its geometric axis that, when the tyre has been completed, is coincident with the rotation axis X of the same. A pair of deposition members 16 operates on the opposite sides of the toroidal support 13 each for the purpose of carrying out application of the continuous thread-like element coming, for example, from a supply reel or directly from an extruder or other convenient supply devices, not shown because they are not of significance to the aims of the invention. The continuous thread-like element 11, preferably coated with a thin layer of elastomer material, can be made of textile or metallic material. Preferably it is of textile material, more preferably selected from the group comprising nylon and poly (ethylene-naphthalene-2,6-di-carboxylate), also known as PEN.

Each deposition member 16 essentially comprises an arm 17 carrying an end roller or another type of applying device 18 oriented in an axis radial to the rotation axis X of the toroidal support 13 and arranged to act in thrust relationship against the toroidal support 13 itself to apply the thread-like element 11 and make it adhere to the end flap of the carcass ply 3 or other support element, at a given application point 18a.

The arm 17 of each deposition member 16 is carried by a first guide structure 19 movable in a first movement direction "L", preferably parallel to the rotation axis X of the toroidal support 13. The first guide structure 19 is in turn movable on a second guide structure 20, along a second direction "N" preferably orthogonal to the first movement direction "L". These movements result in corresponding movements of the applying end roller 18 and consequent displacements of the application point 18a of the thread-like element 11 on the toroidal support 13.

Each arm 17 is also preferably rotatable about an oscillation axis "K" orthogonal to the movement directions "L" and "N".

In order to make each of the reinforcing elements 10, it is essentially provided that the applying end roller 18 of each deposition member 16 should be brought into thrust relationship against the outer surface of the toroidal support 13 to cause application of a first end of the continuous thread-like element 11 against the respective end flap of the carcass ply 3 or other component of tyre 1 previously formed on the toroidal support itself 13.

Preferably, deposition of the continuous thread-like element 11 is preceded by deposition onto the carcass ply 3 of a sheet of appropriate elastomer material.

Alternatively to deposition of said skim coat, the strip-like elements constituting the carcass ply 3 have an asymmetric rubberising coat richer in elastomer material at the outer surface thereof.

Simultaneously with or immediately after application of the first end of the continuous thread-like element 11, the toroidal support 13 is driven in rotation around its geometric axis X. Concurrently with this rotatory motion, the applying end roller 18 of each deposition member 16, and therefore the application point 18a of the respective thread-like element 11, is moved close to or away from the rotation axis X in the movement direction N and along the oscillation axis K.

Figures 3, 4, 5:
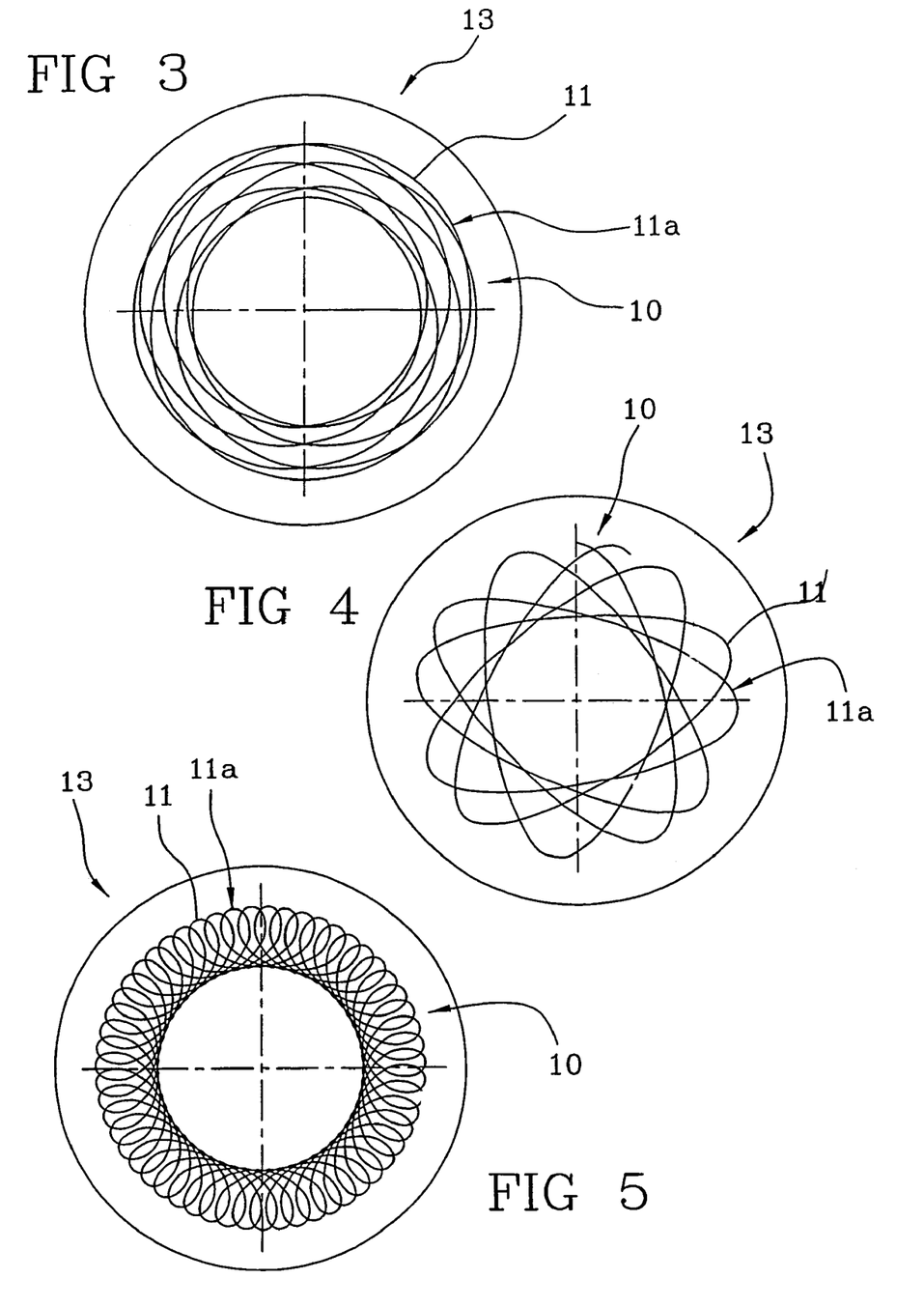
FIGS. 3, 4, 5 diagrammatically show a continuous thread-like element spirally wound up around the rotation axis of the tyre according to three different embodiments of the concerned method.

By effect of the vectorial composition of movements, displacement of the applying end roller 18 is of such a nature that the continuous thread-like element 11 is laid down on support 13 according to a trajectory generated by motion of a point around its own rotation centre which in turn is provided with a revolution motion around the reference axis X. This vectorial composition of movements, together with the revolution motion of the toroidal support 13 around axis X, causes the continuous thread-like element 11 to be laid down according to a trajectory that will form a plurality of mutually intersecting coils substantially concentric with the rotation axis X (FIGS. 3 and 4), or disposed on at least one circumference substantially concentric with the rotation axis X (FIG. 5).

A particular path is that defined by the trajectory generated by motion of a point belonging to or connected with a circumference rolling without slipping along a second circumference the centre of which, in this specific case, is the rotation axis X of the tyre.

The trajectories of this type are generally known as hypotrochoids, epitrochoids, hypocycloids and epicycloids depending on the position of the point with respect to the circumference to which it belongs, or is connected, and on the position of the centre of said circumference with respect to the centre of the second circumference as defined for example in "Academic Press Dictionary of Science and Technology" (edition 1992).

Figure 7:
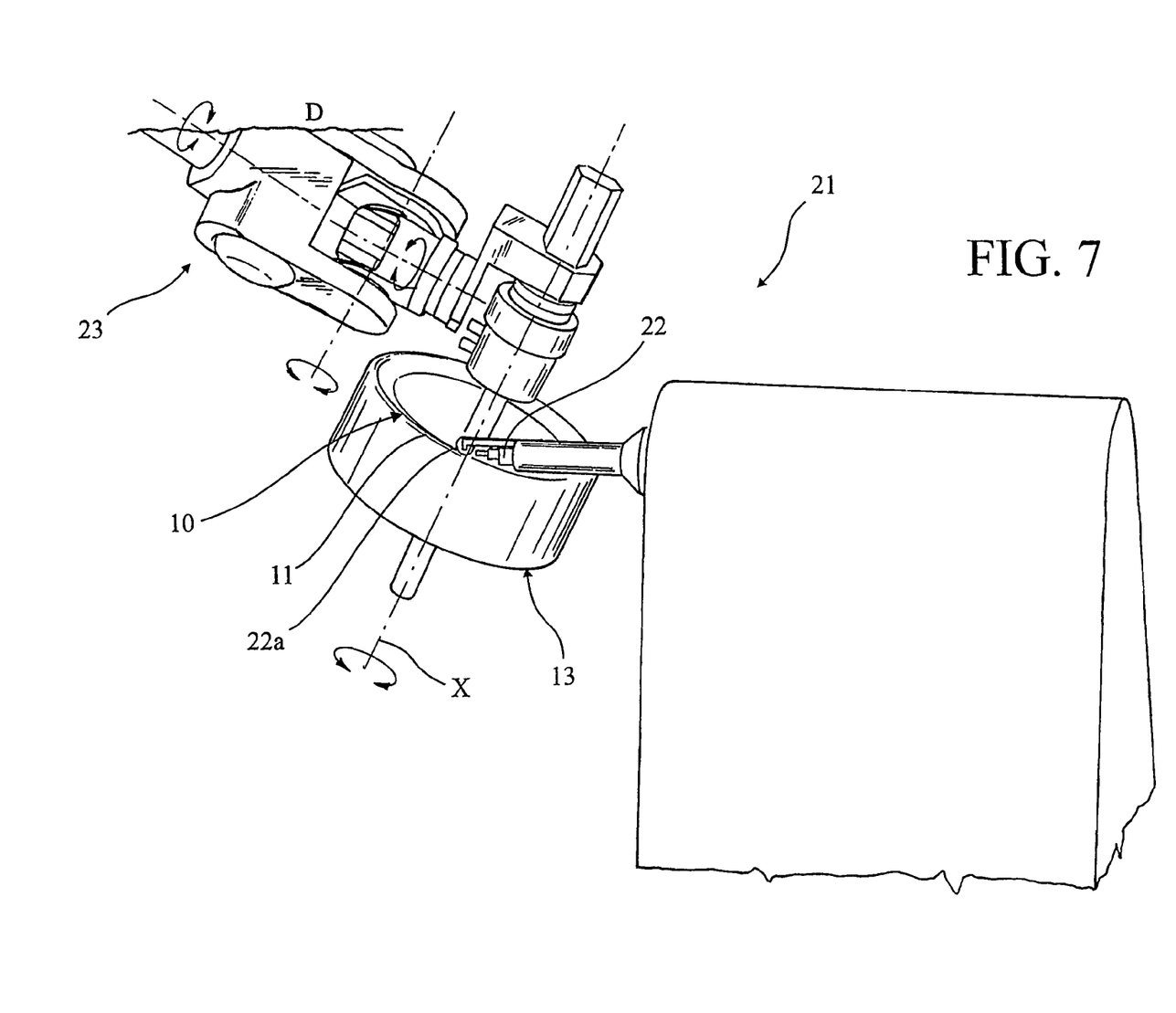

Alternatively, the transverse distribution movement having at least one component orthogonal to axis X, is achieved by moving axis X of the toroidal support 13 by use of a second type of apparatus, partly shown in FIG. 7 and denoted at 21.

In this case, the devices for application of the thread-like element 11 can advantageously be fixed devices 22; consequently the application point is a fixed point 22a too.

For the purpose it is provided that the circumferential distribution means, designed to drive the toroidal support 13 in rotation around its own axis X, and the transverse movement means should be integrated into a robotized arm 23, partly shown in FIG. 7, arranged to removably engage the toroidal support 13, preferably in cantilevered fashion, to conveniently move it with respect to the applying devices 22. Preferably, the robotized arm 23 is a seven-axis anthropomorphous arm, of the type described in WO 00/35666 (in the name of the same Applicant), for example.

During deposition of the reinforcing element 10, the robotized arm 23 carries out suitable orientation of the toroidal support 13 relative to the application point 22a, and drives the support in rotation around the rotation axis X in synchronism with said orientation movements, so as to determine distribution of the thread-like element 11 into mutually intersecting coils 11a.

In particular, concurrently with rotation around axis X, the toroidal support 13 is moved along directions having at least one component orthogonal to the axis X itself.

Irrespective of how they are obtained, coils 11a have a substantially circular extension or more complicated runs, in accordance with the laws of relative motion between the applying devices 18 or 22 and the toroidal support 13.

At all events, the thread-like element 11 is superposed upon itself at a plurality of crossing points distributed along the extension of said coils, to form a network structure on the side portion 3a of tyre 1.

By way of example, a first embodiment shown in FIG. 3 provides arrangement of the thread-like element 11 so as to form substantially circular and slightly eccentric coils 11a disposed around the rotation axis X.

In the context of the present specification and claims, the term "slightly eccentric" is used to mean coils the centre of which is not coincident with the rotation axis of the tyre, but deviates therefrom by a value of about 5% of the fitting diameter.

Alternatively, as shown in FIG. 4, coils 11a have a substantially elliptic shape their major axes being angularly offset with respect to each other.

In more detail, the ellipses substantially have the same sizes, intended as major and minor axes, and are substantially concentric with the rotation axis X. In addition, they are mutually rotated around the rotation axis X itself to give rise to the above-mentioned intersections.

At all events, it is to be noted that, since the assembly of coils 11a is obtained from a single thread-like element 11, each coil 11a, disposed as above described, may not be perfectly circular or elliptic but will rather take an ovoidal conformation.

Advantageously, to increase the intersection points of the thread-like element 11 and together with them the obtainable stiffness on the sidewall of tyre 1, the trajectory defined by the element 11 itself can take more complicated shapes.

For instance, the portion of the thread-like element 11 belonging to a single coil 11a wound around the rotation axis X can in turn be laid down in a helical path involving formation of further nodes or intersection points. In this case the coils are substantially circular and eccentric with respect to each other, and they extend around the rotation axis X of tyre 1. Such a type of structure is clearly shown in FIG. 5.

The configurations shown in FIGS. 3 and 4 are hypotrochoids. This type of curve is mathematically defined by the following system of Cartesian equations:

$$x=(a-b)\cos(t)+c\cos((a/b-1)t)$$

$$y=(a-b)\sin(t)+c\sin((a/b-1)t)$$

describing the trajectory of a point P connected to a circumference B rolling on the inside of a fixed circumference A, being b the radius of circumference B, a the radius of circumference A, c the distance of point P from the centre of circumference B, and t the time variable. In the particular case occurring when (in absolute value) b=c, the resulting curves take the name of hypocycloids.

By varying the sign of constants a, b, c, curves called epitrochoids are described, which are Mathematically defined by the following system of Cartesian equations:

$$x=(a+b)\cos(t)+c\cos((a/b+1)t)$$

$$y=(a+b)\sin(t)+c\sin((a/b+1)t).$$

When (in absolute value) b=c, the resulting curves take the name of epicycloids.

The present invention achieves important advantages.

In fact it will be appreciated that a deposition carried out according to the method in reference enables a greater stiffness of the tyre sidewalls to be achieved. In addition, a deposition carried out in accordance with the method in reference provides further variables, such as the number of crossing points and the particular shape of the coils, for managing stiffness of said sidewalls.

In particular, the method of the present invention enables side-stiffening structures to be made for radial tyres that have a high section ratio, in particular tyres for motorcycles of the "custom" type, for example.

It should be also recognised that the invention, while described with particular reference to accomplishment of reinforcing elements for sidewalls, lends itself to be put into practice in order to make other types of reinforcing elements to be integrated into the structure of a tyre.

Finally, it is to be noted that accomplishment of these reinforcing elements can be also obtained separately of the tyre being processed, either on a toroidal support or a support of other type, for a subsequent application to said tyre.

The invention claimed is:

1. A method of making reinforcing elements for a vehicle tyre, comprising:

laying down at least one continuous thread element on a support element of the tyre according to a deposition path substantially concentric with a rotation axis of the tyre;

wherein the at least one continuous thread element is superposed on itself at a plurality of crossing points and extends between an annular anchoring structure disposed in a bead region and a side edge of a belt structure, the belt structure overlapping at least a portion of the at least one continuous thread element.

2. The method of claim 1, wherein the support element is a carcass ply of the tyre or a sheet of elastomer material disposed on the carcass ply.

3. The method of claim 1, wherein the support element is a carcass ply of the tyre.

4. The method of claim 3, wherein the carcass ply comprises strip elements exhibiting an asymmetric rubberizing coat that is richer in elastomer material at an outer surface of the strip elements.

5. The method of claim 1, wherein the support element is a sheet of elastomer material disposed on a carcass ply of the tyre.

6. The method of claim 1, wherein the at least one continuous thread element is superposed on itself by laying down coils following trajectories selected from the group consisting of hypotrochoids, epitrochoids, hypocycloids, and epicycloids.

7. The method of claim 1, wherein the at least one continuous thread element is superposed on itself by laying down substantially circular coils,
   wherein the substantially circular coils are eccentric with respect to each other, and
   wherein each substantially circular coil extends around the rotation axis of the tyre.

8. The method of claim 1, wherein the at least one continuous thread element is superposed on itself by:
   driving a toroidal support in rotation around the rotation axis of the tyre; and
   moving an application point of the at least one continuous thread element on the support element close to or away from the rotation axis of the tyre according to a movement direction and along an oscillation axis.

9. The method of claim 1, wherein the at least one continuous thread element is superposed on itself by:
   driving a toroidal support in rotation around the rotation axis of the tyre; and
   moving the toroidal support with respect to a fixed application point in a plane orthogonal to the rotation axis of the tyre.

10. A tyre for a vehicle wheel, comprising:
   a carcass structure comprising at least one carcass ply;
   a belt structure applied to a crown portion of the at least one carcass ply at a radially external position relative to the at least one carcass ply;
   a pair of sidewalls applied to axially opposite side portions of the at least one carcass ply at an axially external position relative to the at least one carcass ply;
   a tread band applied to the belt structure at a radially external position of the belt structure; and
   reinforcing elements;
   wherein the at least one carcass ply has its ends in engagement with respective circumferentially inextensible annular anchoring structures,
   wherein the side portions of the at least one carcass ply are separated from each other by the crown portion of the at least one carcass ply,
   wherein the side portions of the at least one carcass ply extend radially away from respective annular anchoring structures,
   wherein the reinforcing elements include at least one continuous thread element formed into coils around a rotation axis of the tyre, and
   wherein the at least one continuous thread element is superposed on itself at a plurality of crossing points and extends between the annular anchoring structure and a side edge of the belt structure, the belt structure overlapping at least a portion of the at least one continuous thread element.

11. The tyre of claim 10, wherein the at least one continuous thread element is disposed in a form of substantially circular coils,
   wherein the substantially circular coils are eccentric with respect to each other, and
   wherein each substantially circular coil extends around the rotation axis of the tyre.

12. The tyre of claim 10, wherein the at least one continuous thread element is disposed in a form of coils following trajectories selected from the group consisting of hypotrochoids, epitrochoids, hypocycloids, and epicycloids.

13. The tyre of claim 10, wherein the at least one continuous thread element is disposed according to a trajectory generated by motion of a point around a rotation center of the thread element, and the rotation center is in turn provided with a revolution motion around the rotation axis of the tyre.

* * * * *